United States Patent
Ikeda

(10) Patent No.: US 12,432,429 B2
(45) Date of Patent: Sep. 30, 2025

(54) IMAGE CAPTURE APPARATUS AND CONTROL METHOD THEREOF, AND IMAGE PROCESSING APPARATUS WITH CORRECTION OF BRIGHTNESS OF IMAGE DATA FOR FRAMES AND WITH COMPOSITING OF IMAGE DATA FOR CORRECTED FRAMES

(71) Applicant: CANON KABUSHIKI KAISHA, Tokyo (JP)

(72) Inventor: Koichiro Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 18/192,174

(22) Filed: Mar. 29, 2023

(65) Prior Publication Data

US 2023/0328339 A1    Oct. 12, 2023

(30) Foreign Application Priority Data

Apr. 7, 2022 (JP) .................................. 2022-063989

(51) Int. Cl.
| | |
|---|---|
| *H04N 23/12* | (2023.01) |
| *H04N 23/743* | (2023.01) |
| *H04N 23/82* | (2023.01) |
| *H04N 23/84* | (2023.01) |

(52) U.S. Cl.
CPC ........... *H04N 23/12* (2023.01); *H04N 23/743* (2023.01); *H04N 23/82* (2023.01); *H04N 23/84* (2023.01)

(58) Field of Classification Search
CPC ...... H04N 23/12; H04N 23/743; H04N 23/82; H04N 23/84; H04N 23/682; H04N 23/741

See application file for complete search history.

(56) References Cited

U.S. PATENT DOCUMENTS

| | | | |
|---|---|---|---|
| 8,723,978 B2 * | 5/2014 | Kwon | H04N 23/70 348/222.1 |
| 10,271,029 B2 | 4/2019 | Osawa | |
| 10,848,682 B2 | 11/2020 | Tashiro | |
| 2010/0157078 A1 * | 6/2010 | Atanassov | G06T 5/50 348/222.1 |
| 2011/0019914 A1 * | 1/2011 | Bimber | G02B 21/367 382/167 |

(Continued)

FOREIGN PATENT DOCUMENTS

| | | |
|---|---|---|
| JP | 2001-136411 A | 5/2001 |
| JP | 2004-048421 A | 2/2004 |

(Continued)

OTHER PUBLICATIONS

Nov. 29, 2024 Japanese Official Action in Japanese Patent Appln. No. 2022-063989.

(Continued)

*Primary Examiner* — Chiawei Chen
(74) *Attorney, Agent, or Firm* — Venable LLP

(57) ABSTRACT

An image capture apparatus obtains image data for a plurality of frames using an image sensor by performing a plurality of shots under an underexposure condition. The image capture apparatus corrects a brightness of the image data for the plurality of frames and generates data of a composite image by compositing the image data for the plurality of frames of which brightness have been corrected.

10 Claims, 7 Drawing Sheets

(56) References Cited

U.S. PATENT DOCUMENTS

| | | | |
|---|---|---|---|
| 2011/0176024 A1* | 7/2011 | Kwon | H04N 23/70 348/222.1 |
| 2012/0162463 A1* | 6/2012 | Doida | H04N 23/68 348/222.1 |
| 2012/0262600 A1* | 10/2012 | Velarde | H04N 23/73 348/223.1 |
| 2013/0335438 A1* | 12/2013 | Ward | G06T 5/94 345/589 |
| 2014/0092012 A1* | 4/2014 | Seshadrinathan | G06T 5/90 345/157 |
| 2014/0152778 A1* | 6/2014 | Ihlenburg | B60R 1/28 348/47 |
| 2015/0036878 A1* | 2/2015 | Nashizawa | G06T 5/50 382/103 |
| 2015/0071537 A1* | 3/2015 | Lim | G06T 5/40 382/168 |
| 2015/0201109 A1* | 7/2015 | Li | H04N 1/4074 348/222.1 |
| 2018/0167594 A1 | 6/2018 | Osawa | |
| 2020/0077008 A1 | 3/2020 | Tashiro | |
| 2021/0314478 A1* | 10/2021 | Cha | G06T 5/70 |
| 2023/0078758 A1* | 3/2023 | Yanagisawa | H04N 23/71 348/226.1 |

FOREIGN PATENT DOCUMENTS

| | | |
|---|---|---|
| JP | 2009-223569 A | 10/2009 |
| JP | 2012-231273 A | 11/2012 |
| JP | 2013-005129 A | 1/2013 |
| JP | 2014-060578 A | 4/2014 |
| JP | 2018-098670 A | 6/2018 |
| JP | 2020-036066 A | 3/2020 |
| JP | 2020-039025 A | 3/2020 |
| JP | 2021-078051 A | 5/2021 |

OTHER PUBLICATIONS

Sep. 2, 2024 Japanese Official Action in Japanese Patent Appln. No. 2022-063989.

Feb. 14, 2025 Japanese Official Action in Japanese Patent Appln. No. 2022-063989.

* cited by examiner

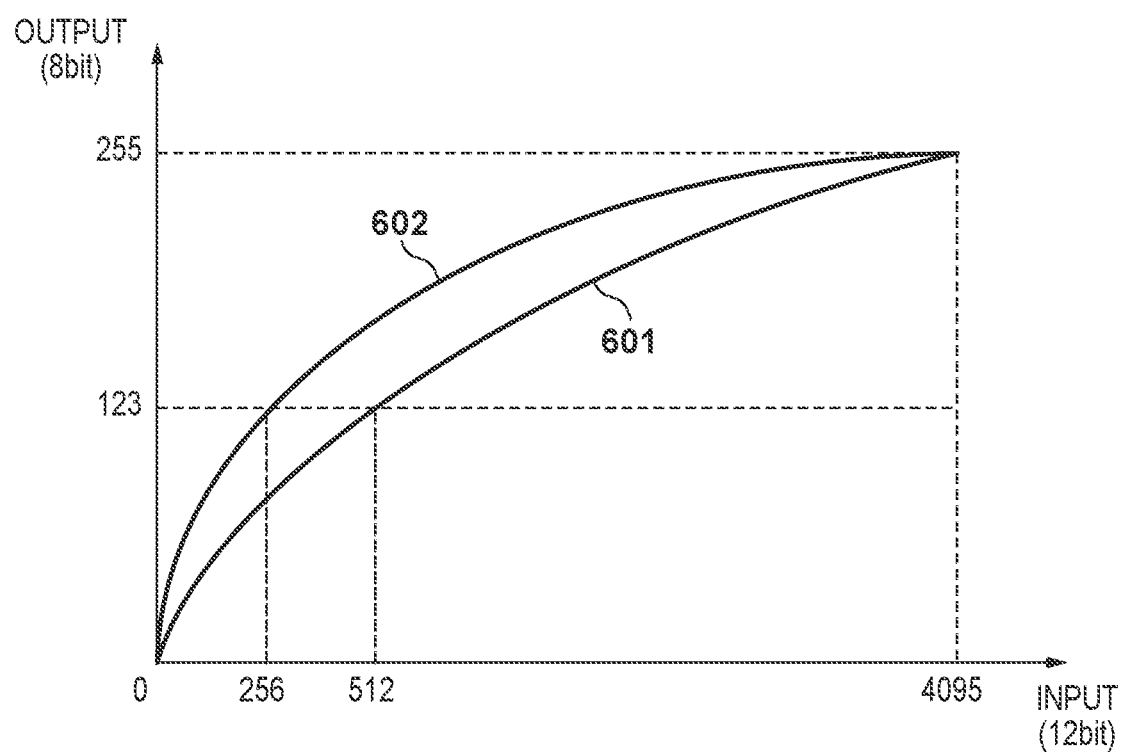

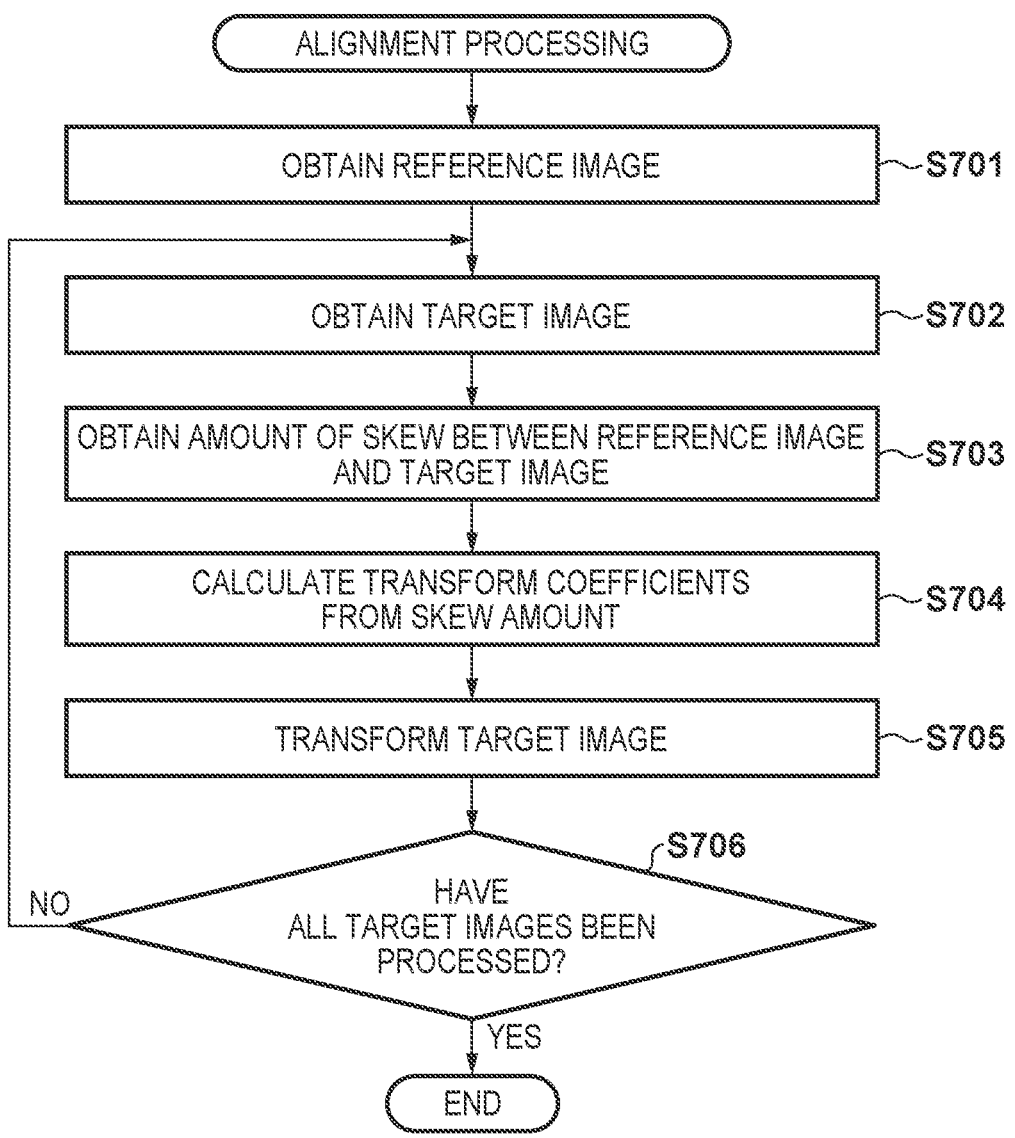

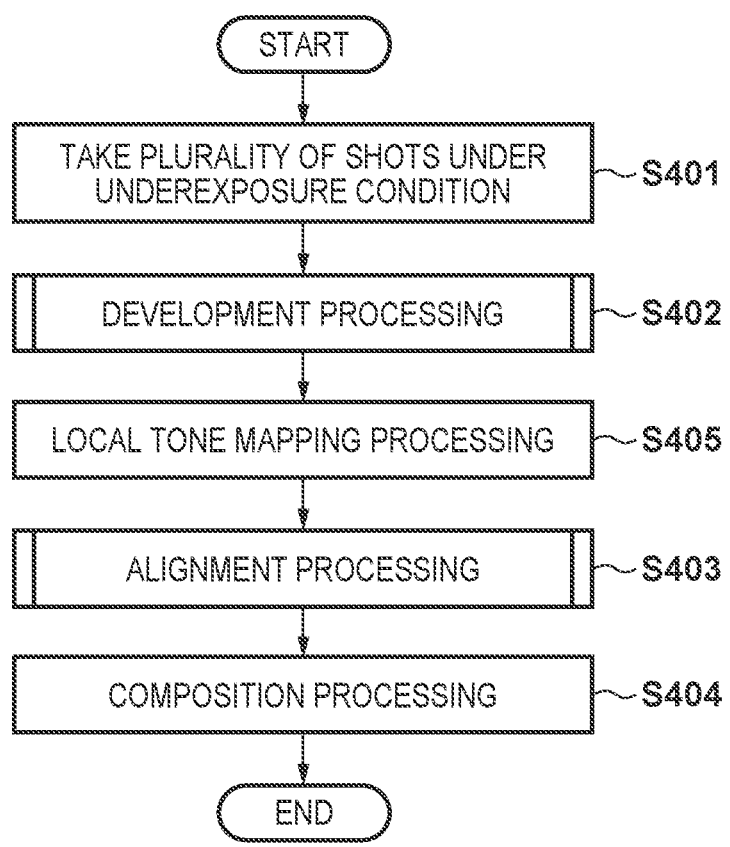

IMAGE CAPTURE APPARATUS AND CONTROL METHOD THEREOF, AND IMAGE PROCESSING APPARATUS WITH CORRECTION OF BRIGHTNESS OF IMAGE DATA FOR FRAMES AND WITH COMPOSITING OF IMAGE DATA FOR CORRECTED FRAMES

BACKGROUND OF THE INVENTION

Field of the Invention

The present invention relates an image capture apparatus and a control method, as well as to an image processing apparatus, and particularly relates to an image compositing technique.

Description of the Related Art

When a scene having a wide dynamic range for luminance, such as a dark scene containing a high-luminance subject (e.g., a night scene), is shot under an appropriate-exposure condition, the high-luminance subject is prone to blown-out highlights. Accordingly, a technique is known in which images of the same scene shot under an underexposure condition, an appropriate-exposure condition, and overexposure are composited to generate an image having a wide dynamic range (Japanese Patent Laid-Open No. 2014-60578).

When shooting the same scene under different exposure conditions, for dark scenes, the exposure period becomes longer particularly for shooting under an appropriate-exposure condition and an overexposure condition, and thus blur due to hand shaking is likely to occur. Accordingly, it is necessary for the image capture apparatus to be fixed to a tripod or the like, resulting in poor usability.

SUMMARY OF THE INVENTION

The present invention provides, in one aspect, an image capture apparatus, and a control method thereof, capable of more easily shooting dark scenes that contain high-luminance subjects.

According to an aspect of the present invention, there is provided an image capture apparatus comprising: an image sensor; and one or more processors that execute a program stored in a memory and thereby function as: an image obtaining unit configured to obtain image data for a plurality of frames using the image sensor by performing a plurality of shots under an underexposure condition; a correction unit configured to correct a brightness of the image data for the plurality of frames; and a generation unit configured to generate data of a composite image by compositing the image data for the plurality of frames corrected by the correction unit.

According to an aspect of the present invention, there is provided an image processing apparatus comprising: one or more processors that execute a program stored in a memory and thereby function as: an obtainment unit that obtains image data for a plurality of frames obtained by shooting under an underexposure condition; a correction unit configured to correct a brightness of the image data for the plurality of frames; and a generation unit configured to generate data of a composite image by compositing the image data for the plurality of frames corrected by the correction unit.

According to an aspect of the present invention, there is provided a method executed by an image capture apparatus having an image sensor, the method comprising: obtaining image data for a plurality of frames using the image sensor by performing a plurality of shots under an underexposure condition; correcting a brightness of the image data for the plurality of frames; and generating data of a composite image by compositing the image data for the plurality of frames corrected.

According to an aspect of the present invention, there is provided a non-transitory machine-readable medium that stores a program for causing, when executed by a computer of an image capture apparatus having an image sensor, the computer to function as an image capture apparatus comprising: an image obtaining unit configured to obtain image data for a plurality of frames using the image sensor by performing a plurality of shots under an underexposure condition; a correction unit configured to correct a brightness of the image data for the plurality of frames; and a generation unit configured to generate data of a composite image by compositing the image data for the plurality of frames corrected by the correction unit.

According to an aspect of the present invention, there is provided a non-transitory machine-readable medium that stores a program for causing, when executed by a computer, the computer to function as an image processing apparatus comprising: an obtainment unit that obtains image data for a plurality of frames obtained by shooting under an underexposure condition; a correction unit configured to correct a brightness of the image data for the plurality of frames; and a generation unit configured to generate data of a composite image by compositing the image data for the plurality of frames corrected by the correction unit.

Further features of the present invention will become apparent from the following description of exemplary embodiments (with reference to the attached drawings).

BRIEF DESCRIPTION OF THE DRAWINGS

FIG. 6 is a diagram illustrating an example of a gamma curve used in an embodiment.

FIG. 7 is a flowchart illustrating an example of alignment processing performed in step S403 of FIG. 4.

FIG. 9 is a flowchart illustrating an example of dark scene shooting processing according to a second embodiment.

DESCRIPTION OF THE EMBODIMENTS

Figure 1:
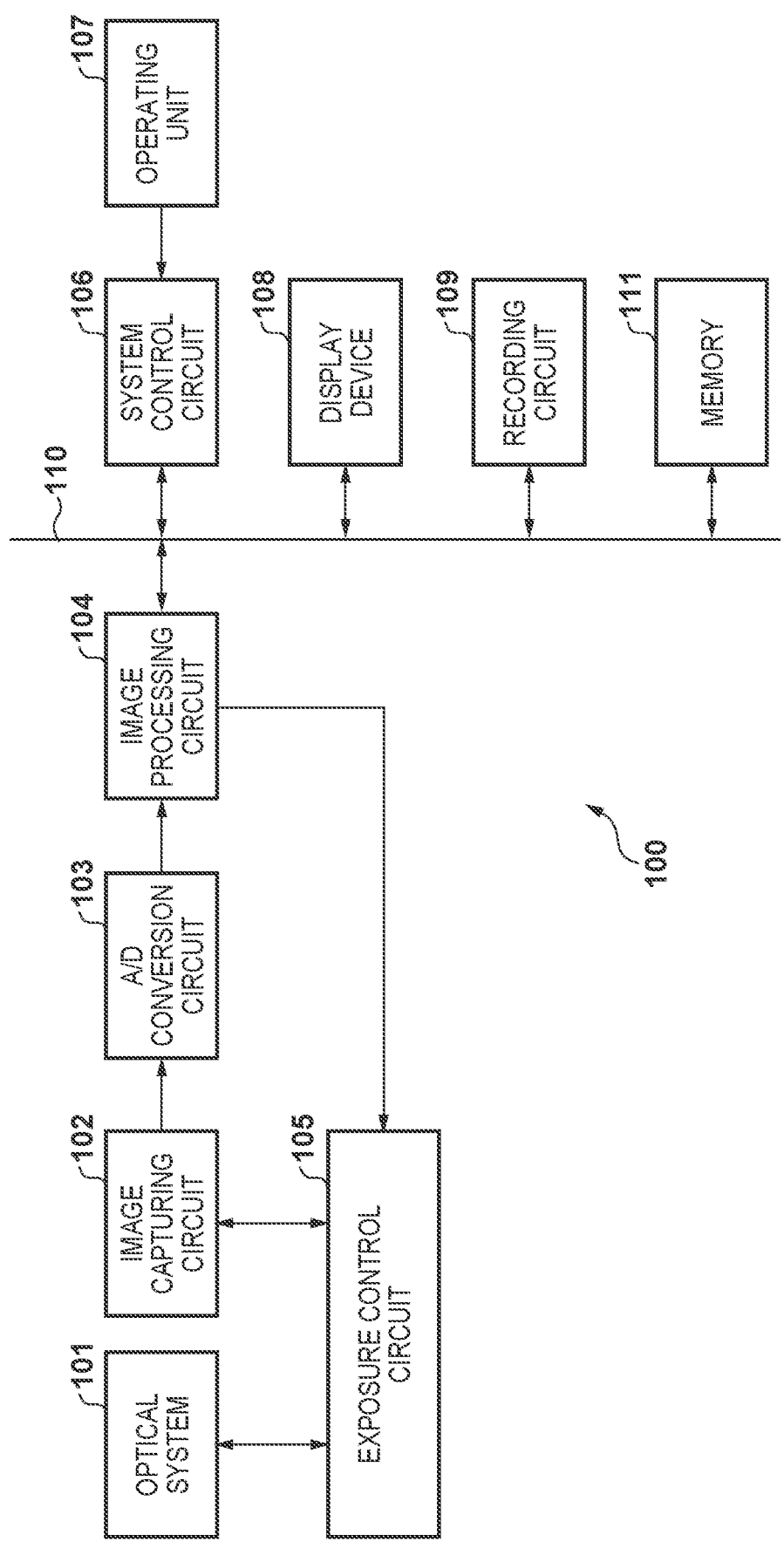
FIG. 1 is a block diagram illustrating an example of the functional configuration of an image capture apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The configurations illustrated in the drawings as blocks may be realized by an integrated circuit (IC) such as an ASIC or an FPGA, by a discrete circuit, or by a combination of a memory and a processor executing a program stored in the memory. In addition, a single block may be realized by a plurality of integrated circuit packages, or a plurality of blocks may be realized by a single integrated circuit package. Additionally, the same block may be implemented in different configurations in accordance with the operating environment, required capabilities, or the like.

Note that the following will describe embodiments where the present invention is applied in an image capture apparatus such as a digital camera. However, the present invention can be applied in any electronic device having an image capture function. Examples of such an electronic device include computer devices (personal computers, tablet computers, media players, PDAs, and the like), mobile phones, smartphones, game consoles, robots, drones, dashboard cameras, and the like, in addition to image capture apparatuses. These are merely examples, however, and the present invention can be applied in other electronic devices as well.

First Embodiment

FIG. 1 is a block diagram illustrating an example of the functional configuration of an image capture apparatus 100 according to an embodiment of the present invention. FIG. 1 illustrates only representative constituent elements among those included in the image capture apparatus 100. An optical system 101 includes a plurality of lenses, an aperture stop that also acts as a shutter, an aperture driving mechanism, and the like, and forms an optical image of a subject. The plurality of lenses include movable lenses such as a focus lens for adjusting the focal distance of the optical system 101, a zoom lens for changing the angle of view, and the like. The optical system 101 also includes drive mechanisms for the movable lenses.

An image capture circuit 102 may be a publicly-known CCD or CMOS color image sensor having, for example, a primary color Bayer array color filter. The image capture circuit 102 includes a pixel array, in which a plurality of pixels are arranged two-dimensionally, and peripheral circuitry for reading out signals from the pixels. Each pixel accumulates a charge corresponding to an amount of incident light through photoelectric conversion. By reading out, from each pixel, a signal having a voltage corresponding to the charge amount accumulated during an exposure period, a group of pixel signals (analog image signals) representing a subject image formed by the optical system 101 is obtained.

An A/D conversion circuit 103 A/D-converts the analog image signals read out from the image capture circuit 102 into digital image signals (image data). Note that the A/D conversion circuit 103 is unnecessary if the image capture circuit 102 has an A/D conversion function.

An image processing circuit 104 generates signals and image data for different purposes, obtains and/or generates various types of information, and so on by applying predetermined image processing to the image data output by the A/D conversion circuit 103, image data read out from a recording circuit 109, and the like. The image processing circuit 104 may be a dedicated hardware circuit, such as an Application Specific Integrated Circuit (ASIC) designed to implement a specific function, for example. Alternatively, the image processing circuit 104 may be constituted by a processor such as a Digital Signal Processor (DSP) or a Graphics Processing Unit (GPU) executing software to implement a specific function.

The image processing that can be applied to the image data by the image processing circuit 104 can include preprocessing, color interpolation processing, correction processing, detection processing, data processing, evaluation value calculation processing, special effect processing, and so on, for example.

The preprocessing includes signal amplification, reference level adjustment, defective pixel correction, and the like.

The color interpolation processing is performed when the image capture circuit 102 is provided with a color filter, and interpolates the values of color components that are not included in the individual pixel data constituting the image data. Color interpolation processing is also called "demosaicing".

The correction processing can include white balance adjustment, tone adjustment, correction of image degradation caused by optical aberrations of the optical system 101 (image restoration), correction of the effects of vignetting in the optical system 101, color correction, and the like.

The detection processing includes detecting a feature region (e.g., a face area or a human body area) or motion in such an area, processing for recognizing a person, or the like.

The data processing can include cropping an area (trimming), compositing, scaling, encoding and decoding, and header information generation (data file generation). The generation of display image data and recording image data is also included in the data processing.

The evaluation value calculation processing can include processing such as generating signals, evaluation values, and the like used in automatic focus detection (AF), generating evaluation values used in automatic exposure control (AE), and the like.

The special effect processing includes adding bokeh effects, changing color tones, relighting processing, and the like.

Note that these are merely examples of the processing that can be applied to the image data by the image processing circuit 104, and the processing applied by the image processing circuit 104 is not limited thereto.

An exposure amount control circuit 105 determines shooting conditions (aperture value, shutter speed, and ISO sensitivity) according to evaluation values calculated by the image processing circuit 104 and a predetermined program chart. Additionally, the exposure amount control circuit 105 controls operations of the optical system 101 (the aperture stop) and the image capture circuit 102 based on shooting conditions determined during shooting. The exposure amount control circuit 105 also drives the optical system 101 (the focus lens) based on the evaluation values calculated by the image processing circuit 104, and adjusts the focal distance of the optical system 101.

A system control circuit 106 includes, for example, a processor (a CPU, an MPU, a microprocessor, or the like) capable of executing programs, a ROM, and a RAM. The system control circuit 106 controls the operations of the respective circuits/units of the image capture apparatus 100, and implements the functions of the image capture apparatus 100, by loading programs stored in the ROM into the RAM and executing the programs.

The ROM is rewritable, and stores programs executed by the processor, various types of setting values and GUI data of the image capture apparatus 100, and the like. The RAM is a main memory used when the system control circuit 106 executes programs.

"Operating unit 107" is a collective name for input devices (buttons, switches, dials, and the like) provided for a user to input various types of instructions to the image capture apparatus 100. The input devices constituting the operating unit 107 are named according to the functions assigned thereto. For example, the operating unit 107 includes a release switch, a moving image recording switch, a shooting mode selection dial for selecting a shooting mode, a menu button, a directional key, an OK key, and the like.

The release switch is a switch for recording a still image, and the system control circuit 106 recognizes the release switch being in a half-pressed state as a shooting preparation instruction, and the release switch being in a fully-pressed state as a shooting start instruction. Additionally, the system control circuit 106 recognizes the moving image recording switch being pressed while in a shooting standby state as a moving image recording start instruction, and recognizes the moving image recording switch being pressed while recording a moving image as a recording stop instruction. Note that the functions assigned to the same input device may be variable. Additionally, the input devices may include software buttons or keys which use a touch screen. Additionally, the operating unit 107 may include an input device that corresponds to a non-contact input method, such as voice input, gaze input, or the like.

A display device 108 displays images based on image data obtained from the shooting, image data read out from the recording circuit 109, and the like. The display device 108 is, for example, a liquid crystal display or an organic EL display. The display device 108 can be caused to function as an electronic viewfinder (EVF) by shooting a moving image and at the same time displaying the moving image obtained by the shooting in the display device 108.

The recording circuit 109 is a storage device that stores recording image data generated by the image processing circuit 104. The recording circuit 109 may be a storage device using a non-volatile memory, a magnetic disk, or the like, for example. The recording circuit 109 may be a storage device using a removable recording medium.

A memory 111 is a RAM, for example, and is used by the image processing circuit 104, the system control circuit 106, or the like to temporarily store various types of data, such as intermediate data. Part of the memory 111 may be used as video memory.

A bus 110 is used to communicate data and control signals among blocks connected thereto.

Figure 2:
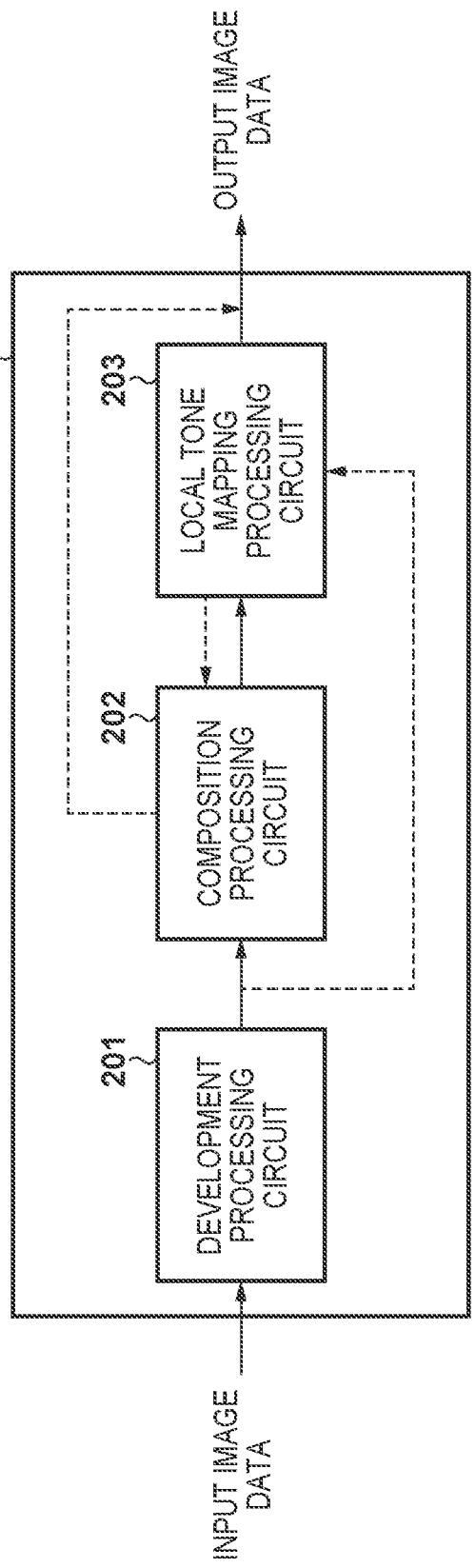
FIG. 2 is a block diagram illustrating an example of the functional configuration of an image processing circuit illustrated in FIG. 1.

FIG. 2 illustrates operations pertaining to image composition, executed by the image processing circuit 104 in the present embodiment, as function blocks. Individual pixel data constituting input image data supplied to the image processing circuit 104 from the A/D conversion circuit 103 has a single color component (an R (red), G (green), or B (blue) component) corresponding to the color filter of the primary color Bayer array in the image capture circuit 102.

A development processing circuit 201 generates color image data according to the intended purpose from the input image data. The color image data is image data in which individual pixel data has a color component necessary to express a color image, such as YUV or RGB.

Figure 3:
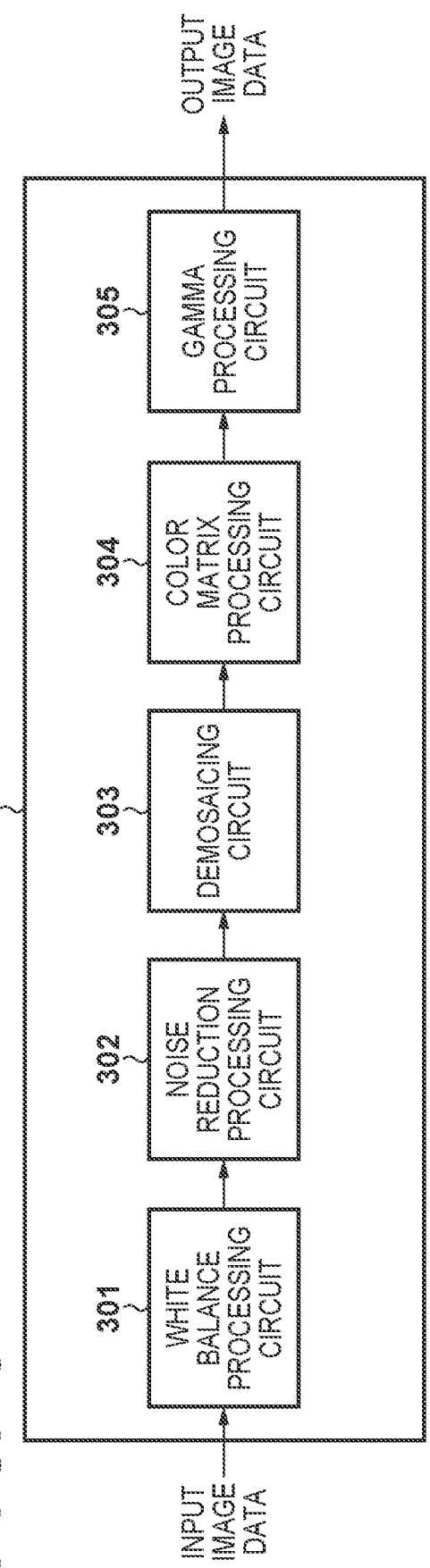
FIG. 3 is a block diagram illustrating an example of the functional configuration of a development processing circuit illustrated in FIG. 2.

FIG. 3 is a block diagram illustrating an example of the functional configuration of the development processing circuit 201.

The input image data is input to a white balance processing circuit 301. The white balance processing circuit 301 applies white balance coefficients to the input image data. The white balance coefficients can be calculated from the input image data through a publicly-known method, for example. The white balance processing circuit 301 outputs the processed image data to a noise reduction processing circuit 302.

The noise reduction processing circuit 302 applies noise reduction processing that reduces dark current noise, light shot noise, and so on to the image data. The noise reduction processing may be publicly-known processing using, for example, a low-pass filter (LPF), a binary filter, or the like. The noise reduction processing circuit 302 outputs the processed image data to a demosaicing circuit 303.

The demosaicing circuit 303 applies demosaicing to the image data. Demosaicing is also called "color interpolation processing". By interpolating the values of the color components that are missing from the individual pixel data using, for example, the values of neighboring pixels, the individual pixel data takes on values of the three components R, G, and B. The demosaicing can be realized using a publicly-known method, such as generating the value of a color component that is missing by interpolating the values of neighboring pixels having the values of that color component, for example. The demosaicing circuit 303 outputs the processed image data to a color matrix processing circuit 304.

The color matrix processing circuit 304 applies color matrix processing to the image data for matching the color gamut of the image data to the color gamut of an output device. The color matrix processing can be realized by a publicly-known method based on the spectral properties of the image capture circuit 102 (the image sensor) and the color gamut of the apparatus to which the image data is output. The color matrix processing circuit 304 outputs the processed image data to a gamma processing circuit 305.

The gamma processing circuit 305 applies an opto-electronic transmission function (OETF) to the image data. The OETF applied here is determined in accordance with an electro-optical transfer function (EOTF) of the device to which the image data is output (the display device). As a result of the gamma processing, the values of the image data are converted into values that can be displayed properly in the device to which the image data is output. The image data to which the gamma processing has been applied is output to a composition processing circuit 202.

Returning to FIG. 2, the composition processing circuit 202 performs alignment processing on the image data of a plurality of frames generated by the development processing circuit 201, and composition processing on the image data of the plurality of frames that have been aligned. The composition processing circuit 202 generates composite image data by, for example, finding the arithmetic mean of a plurality of frames' worth of image data for each of corresponding pixels. The composition processing circuit 202 outputs the generated composite image data to a local tone mapping processing circuit 203.

The local tone mapping processing circuit 203 applies local tone mapping processing to the composite image data. The local tone mapping processing is, for example, processing for changing the brightness of a local area of low luminance to medium luminance (brightening, in this case).

A series of operations performed when the image capture apparatus 100 according to the present embodiment generates a composite image will be described next. For example, when a mode for shooting a dark scene, such as a night scene shooting mode, is set, or when the shooting scene is determined to be a dark scene based on analysis of captured images, the image capture apparatus 100 can shoot a plurality of frames under the assumption that composition will be performed, and generate a composite image. Hereinafter, processing for generating an image of a dark scene by taking a plurality of shots and compositing the plurality of frames' worth of image data obtained will be called "dark scene shooting processing".

Figure 4:
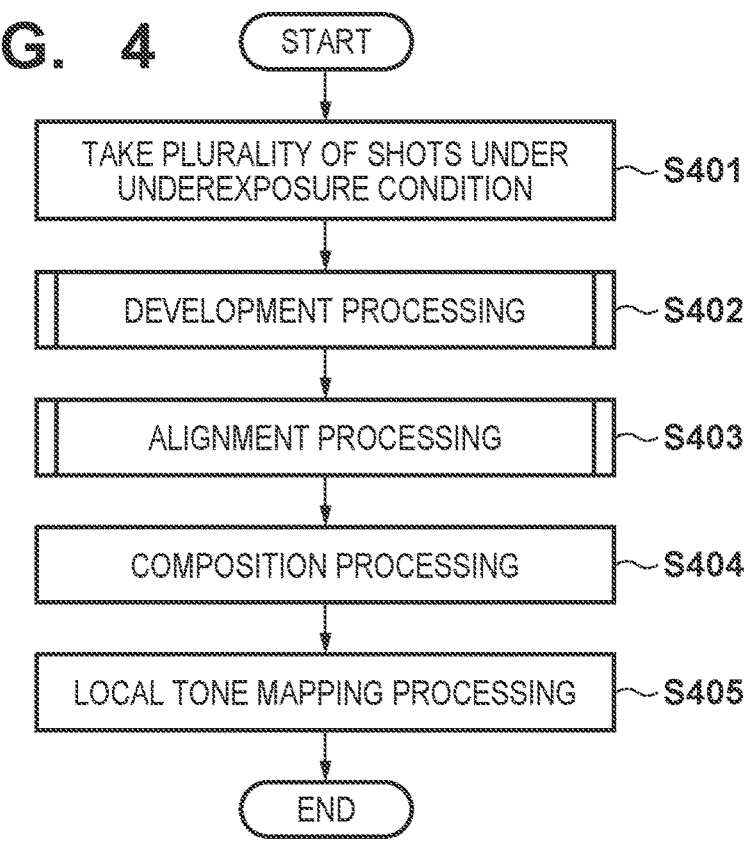
FIG. 4 is a flowchart illustrating an example of dark scene shooting processing according to a first embodiment.

FIG. 4 is a flowchart pertaining to the dark scene shooting processing performed by the image capture apparatus 100 according to the present embodiment.

Upon detecting that a shooting start instruction has been input from the operating unit 107, in step S401, the system control circuit 106 instructs the exposure amount control circuit 105 to start shooting a still image according to the dark scene shooting processing.

Note that the exposure amount control circuit 105 is assumed to have sequentially determined shooting conditions for obtaining an appropriate-exposure condition from the evaluation values generated by the image processing circuit 104 based on, for example, moving image data shot for live view display, while in the shooting standby state. It is also assumed that the exposure amount control circuit 105 continuously drives the focus lens based on the evaluation values generated by the image processing circuit 104 based on, for example, the moving image data shot for the live view display.

In response to an instruction from the system control circuit 106, the exposure amount control circuit 105 executes still image shooting processing a plurality of times in succession under an underexposure condition. Note that the extent of the underexposure condition relative to the appropriate-exposure condition, and the number of shots taken, are assumed to be determined in advance. Here, it is assumed, as one example, that three images are shot at 1 Ev under exposure from the appropriate-exposure condition. Note that the number of shots may be determined dynamically in accordance with, for example, at least one of the shooting conditions for obtaining an appropriate-exposure condition, the brightness of the scene, and the magnitude of the difference between the underexposure condition and the appropriate-exposure condition.

Meanwhile, the difference between the underexposure condition and the appropriate-exposure condition may be determined dynamically based on, for example, luminance information of the shooting scene, or may be determined using another method. Alternatively, the user may be able to specify the items as desired.

Shooting under an underexposure condition enables shooting at a faster shutter speed than when shooting under an appropriate-exposure condition or an overexposure condition. This makes it possible to shorten the length of time required to take multiple shots, and suppress blur caused by hand shake.

For every shot of one frame is performed, image data obtained is supplied to the image processing circuit 104 through the image capture circuit 102 and the A/D conversion circuit 103.

In step S402, the image processing circuit 104 (the development processing circuit 201) applies demosaicing and the like to the image data as described above, and generates full-color image data.

In step S403, the image processing circuit 104 (the composition processing circuit 202) applies alignment processing to the full-color image data generated by the development processing circuit 201.

In step S404, the image processing circuit 104 (the composition processing circuit 202) generates composite image data by compositing three frames' worth of the image data aligned in step S403.

In step S405, the image processing circuit 104 (the local tone mapping processing circuit 203) applies local tone mapping processing to the composite image data generated in step S404. The system control circuit 106 stores the composite image data to which the local tone mapping processing has been applied and which has been output from the image processing circuit 104 in a data file in a predetermined format and records that data file in the recording circuit 109. Note that the system control circuit 106 can apply necessary processing such as encoding processing to the composite image data prior to the recording.

The image processing circuit 104 may also cause the display device 108 to display a composite image by generating image data for display from the generated composite image data and writing the image data for display into a video memory area of the memory 111.

Development Processing

Figure 5:
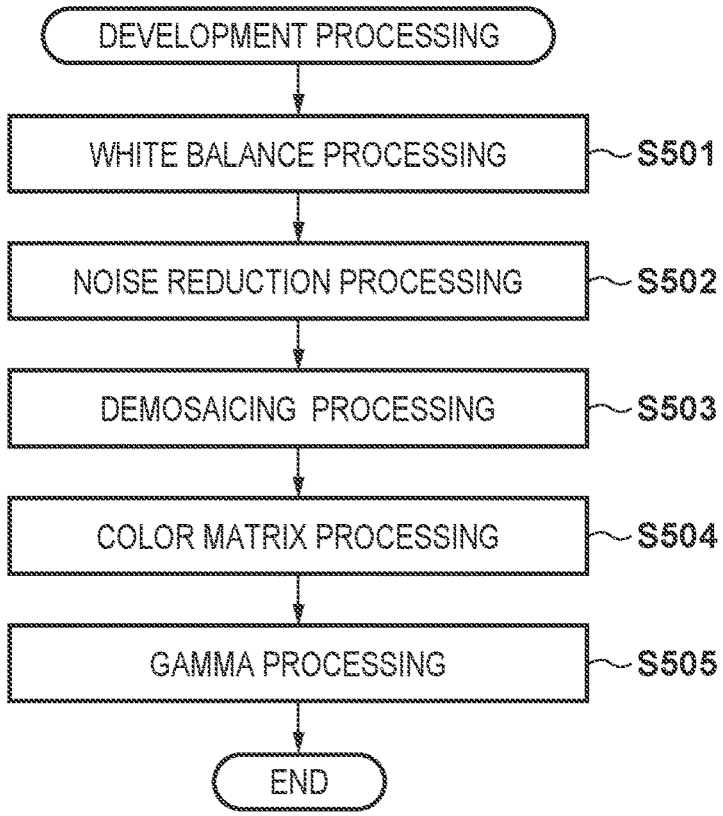
FIG. 5 is a flowchart illustrating an example of development processing performed in step S402 of FIG. 4.

The development processing in step S402 of FIG. 4 will be described in detail next with reference to the flowchart in FIG. 5. Here, the processing executed by the development processing circuit 201 is referred to as "development processing". The steps in FIG. 5 correspond to processes performed by each of the function blocks 301 to 305 illustrated in FIG. 3.

In step S501, the white balance processing circuit 301 applies, to the input image data, white balance processing for adjusting the color balance in accordance with the color temperature of the ambient light at the time of shooting. The white balance processing is processing for adjusting the color balance of an image by multiplying each of the R, G, and B components by a separate gain, as indicated by the following Formula (1).

In Formula (1), $R_{in}$, $G_{in}$, and $B_{in}$ are the values of the R, G, and B components prior to the white balance processing. Meanwhile, $R_{out}$, $G_{out}$, and $B_{out}$ are values of the R, G, and B components after the white balance processing. $Gain_R$, $Gain_G$, and $Gain_B$ are gains by which the R, G, and B components, respectively, are multiplied.

$$R_{out} = Gain_R \times R_{in}$$

$$G_{out} = Gain_G \times G_{in}$$

$$B_{out} = Gain_B \times B_{in} \tag{Formula (1)}$$

Note that, for example, by estimating the color temperature of the ambient light and extracting a white area based on the color temperature from the image, the gain values can be determined as coefficient values that cause the pixels in the white area to take on an achromatic color. The white balance processing circuit 301 outputs the processed image data to a noise reduction processing circuit 302.

In step S502, the noise reduction processing circuit 302 applies noise reduction processing for reducing dark current noise, light shot noise, and so on to the input image data. The noise reduction processing can be performed through a publicly-known method using, for example, a low-pass filter, a binary filter, or the like. The noise reduction processing circuit 302 outputs the processed image data to a demosaicing circuit 303.

In step S503, the demosaicing circuit 303 applies demosaicing to the input image data. As described above, the demosaicing causes the individual pixel data constituting the image data to have values of three components, namely R, G, and B. The demosaicing circuit 303 outputs the processed image data to a color matrix processing circuit 304.

In step S504, the color matrix processing circuit 304 of the development processing circuit 201 applies color matrix processing for matching the color gamut of the output device to the input image data. Specifically, the color matrix processing circuit 304 applies a matrix constituted by 3×3 coefficients $k_{11}$ to $k_{33}$ to the color component values $R_{in}$, $G_{in}$, and $B_{in}$ for each instance of pixel data in the input image data, as indicated by the following Formula (2), for example. Through this, the color component values of each instance of the pixel data are converted into color component values $R_{out}$, $G_{out}$, and $B_{out}$ suitable for the color gamut handled by the output device.

$$\begin{pmatrix} R_{out} \\ G_{out} \\ B_{out} \end{pmatrix} = \begin{pmatrix} K_{11} & K_{12} & K_{13} \\ K_{21} & K_{22} & K_{23} \\ K_{31} & K_{32} & K_{33} \end{pmatrix} * \begin{pmatrix} R_{in} \\ G_{in} \\ B_{in} \end{pmatrix} \quad \text{Formula (2)}$$

The color matrix processing circuit 304 outputs the processed image data to a gamma processing circuit 305.

In step S505, the gamma processing circuit 305 applies, to the input image data, an opto-electronic transmission function (OETF) corresponding to an electro-optical transfer function (EOTF) that expresses the input/output characteristics of the output display device. EOTF and OETF are also called "gamma curves" or "gamma characteristics".

A specific example of the gamma processing performed by the gamma processing circuit 305 will be described here. In the present embodiment, the gamma processing circuit 305 selectively applies the gamma processing using one of a predetermined plurality of OETFs. For example, the gamma processing circuit 305 uses either an OETF for a case where high-luminance tones are to be prioritized, or an OETF for a case where high-luminance tones are not to be prioritized.

When high-luminance tones are to be prioritized, an EOTF having characteristics that raise the brightness of half-tones is applied in the output device. This makes it possible to obtain an effect of suppressing the blown-out highlights of high-luminance parts by capturing under an underexposure condition while keeping the overall brightness of the image ultimately displayed at the same level as the appropriate-exposure condition. Note that when high-luminance tones are to be prioritized, an OETF that prioritizes high-luminance tones may be used in the gamma processing circuit 305, and an EOTF that does not prioritize high-luminance tones may be used in the output device.

Accordingly, when executing dark scene shooting processing, the gamma processing circuit 305 applies gamma processing to the image data using an OETF that prioritizes high-luminance tones.

FIG. 6 illustrates a specific example of an OETF (high-luminance priority OETF) 602 for the case where high-luminance tones are to be prioritized, and an OETF (normal OETF) 601 for the case where high-luminance tones are not to be prioritized. Here, it is assumed that the image data output by the A/D conversion circuit 103 has a tone value of 12 bits per color component (0 to 4095). It is also assumed that a target tone value (AE target value) in automatic exposure (AE) is 512. The AE target value is a tone value obtained when a subject having a specific brightness, specifically an achromatic-color subject having a reflectance of 18%, is shot under an appropriate-exposure condition. In other words, in the AE processing, the shooting conditions are determined such that the tone value obtained when an achromatic-color subject having a reflectance of 18% is captured is the AE target value.

Here, image data having 8-bit tone values (0 to 255) per color component is recorded, and thus both the OETFs 601 and 602 have input/output characteristics that convert 12-bit input values into 8-bit output values. However, the OETFs 601 and 602 need not convert the bit number, and the conversion of the bit number may be executed separately.

The normal OETF 601 (a first gamma curve) is designed such that the AE target value 512 is converted into a tone value 123, which is a median value in the output tone range of 0 to 255. This is because an achromatic color having a reflectance of 18% is visible to the human eye as a brightness in the middle between white and black.

Here, in the dark scene shooting processing, the shot is taken under an underexposure condition 1 Ev under the appropriate-exposure condition, and thus the tone value of the achromatic-color subject having a reflectance of 18% is 256. The high-luminance priority OETF 602 (a second gamma curve) used in the dark scene shooting processing is designed such that a rise in an area where the tone values are low has tone characteristics that are steeper than those of the normal OETF 601, and the input tone value 256 is converted into an output tone value 123.

In other words, by applying gamma processing using the high-luminance priority OETF 602, the brightness of the image obtained by shooting under an underexposure condition of 1 Ev is converted into a brightness equivalent to the brightness of the image obtained by shooting under an appropriate-exposure condition.

However, by shooting under an underexposure condition, there may be pixels, among pixels having tone values which saturate when shooting under an appropriate-exposure condition, that are not saturated. In other words, the effect of suppressing blown-out highlights can be achieved by shooting under an underexposure condition.

In this manner, combining shooting under an underexposure condition with gamma processing using the high-luminance priority OETF 602 makes it possible to obtain an image that suppresses blown-out highlights in high-luminance parts while maintaining the brightness of the overall image.

Alignment Processing and Composition Processing

The alignment processing in step S403 of FIG. 4 and the composition processing in step S404 will be described in detail next. First, the alignment processing in step S403 of FIG. 4 will be described in detail with reference to the flowchart in FIG. 7.

In step S701, the composition processing circuit 202 obtains the data of an image that serves as a reference for alignment (a reference image) from image data for a plurality of frames. The data of the reference image may be image data obtained from the first instance of shooting in the dark scene shooting processing.

In step S702, the composition processing circuit 202 obtains data of an image to be aligned with the reference image (a target image). The target image is an image, aside from the reference image, that has not been aligned. When the reference image is taken as the image obtained by the first instance of shooting, the composition processing circuit 202 can obtain the image data obtained by the second and subsequent instances of shooting in sequence as the data of the target image.

In step S703, the composition processing circuit 202 obtains an amount of positional skew between the reference image and the target image. The composition processing circuit 202 can obtain a motion vector of the target image with respect to the reference image as the amount of positional skew. The composition processing circuit 202 searches for areas in the target image that are most similar to a template by, for example, dividing the reference image into a plurality of blocks of the same size and performing template matching using each block as a template. The similarity between images can be calculated as a sum of the absolute differences (SAD), a sum of the squares of difference (SSD), or a normalized cross-correlation (NCC) of the values of the corresponding pixels. The search range may be the entire target image or a part of the target image.

The composition processing circuit 202 then detects, as a motion vector, a difference between the position of the area searched for and the position in the reference image of the block used as the template. The composition processing circuit 202 obtains a motion vector of the target image as a whole relative to the reference image from motion vectors detected on a block-by-block basis, and takes that overall motion vector as the amount of positional skew.

In step S704, the composition processing circuit 202 calculates transform coefficients from the amount of positional skew between the reference image and the target image. The composition processing circuit 202 calculates projection transform coefficients as the transform coefficients, for example. The affine transformation coefficients, a more convenient horizontal and vertical shift amount, or the like may be calculated as the transform coefficients.

In step S705, the composition processing circuit 202 transforms the target image using the transform coefficients calculated in step S704. For example, the composition processing circuit 202 can transform the target image according to the following Formula (3).

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad \text{Formula (3)}$$

In Formula (3), (x, y) represents coordinates before the transform, and (x', y') represents the coordinates after the transform. A matrix A indicates the transform coefficients calculated by the composition processing circuit 202 in S704. The composition processing circuit 202 stores the data of the target image after the transform in the memory 111, for example, as image data that has undergone alignment processing.

In step S706, the composition processing circuit 202 determines whether the alignment processing has been applied to all images aside from the reference image. The composition processing circuit 202 repeats the processing from step S702 if it is determined that images to which the alignment processing has not been applied remain. The composition processing circuit 202 ends the processing illustrated in the flowchart in FIG. 7 if it is determined that the alignment processing has been applied to all images aside from the reference image.

The composition processing performed by the composition processing circuit 202 in step S404 of FIG. 4 will be described next.

The composition processing circuit 202 obtains the aligned image data in sequence from the memory 111, and composites that data with the reference image. The composition processing circuit 202 generates data of a composite image by finding an arithmetic mean of the pixel data at corresponding coordinates, for example. Random noise superimposed on the image can be reduced by finding the arithmetic mean. Although the data of the composite image may be generated by a method aside from finding the arithmetic mean, a method which reduces random noise is desirable.

Local Tone Mapping Processing

The local tone mapping processing executed by the local tone mapping processing circuit 203 in step S405 of FIG. 4 will be described next. Note that an image in which blown-out highlights (saturation) of high-luminance parts are suppressed and the dynamic range is expanded can be obtained by compositing after converting the image obtained by shooting under an underexposure condition to a brightness equivalent to the appropriate-exposure condition through gamma processing. The local tone mapping processing is therefore not absolutely necessary. However, applying the local tone mapping processing makes it possible to achieve further expansion of the dynamic range.

The local tone mapping processing according to the present embodiment is processing for locally brightening an area of low luminance to medium luminance. Applying such local tone mapping processing makes it possible to improve the tone of dark areas while maintaining the tone of the high-luminance areas.

Additionally, an underexposed image in which degradation of the tone in high-luminance parts is better suppressed can be generated when an image is captured under an underexposure condition greater than 1 Ev and similar development processing is performed on the input image in the image capture to development processing described above.

The local tone mapping processing can be realized through a publicly-known method in which a gain map, in which the tone characteristics change locally using determination results for images, areas, and the like in different frequency bands, is generated, and tone conversion processing is applied while referring to the gain map.

Figure 8A:
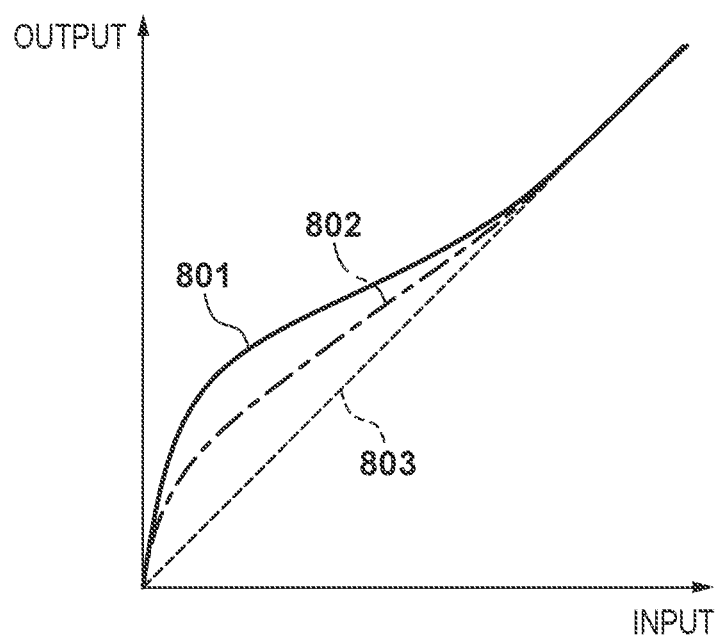
FIGS. 8A to 8C are diagrams illustrating an example of a gain map used in local tone mapping processing.

FIG. 8A is a diagram illustrating an example of the gain map used in the local tone mapping. The gain map is similar to the gamma characteristics in that the gain map represents the characteristics of the tone transformation, and the local tone mapping processing can also be said to be a local gamma processing.

A gain map 803 is a straight line having a slope of 1 and passing through the origin. The gain map 803 has characteristics that do not change the tone value. On the other hand, gain maps 801 and 802 have tone characteristics that correct the input tone values from low luminance to medium luminance such that the values become brighter. The gain map 801 has a higher correction amount than the gain map 802. In the present embodiment, the gain map used in the local tone mapping processing is generated by weighted adding of the gain maps 801 and 802 that have different correction amounts.

Figure 8B:
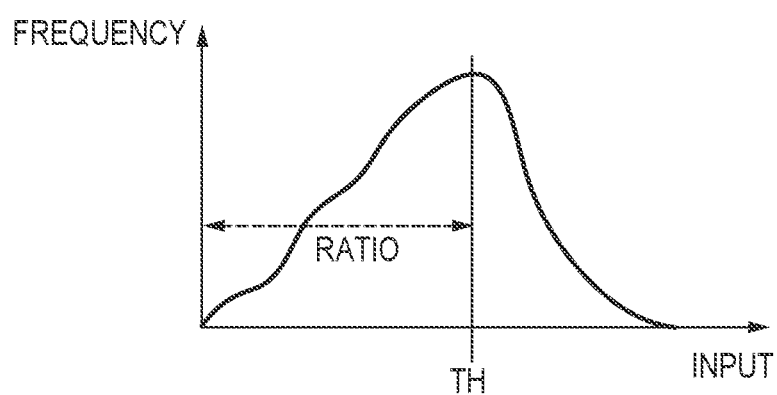

Specifically, the local tone mapping processing circuit 203 generates a histogram of the input composite image data. FIG. 8B illustrates an example of the histogram. The local tone mapping processing circuit 203 then calculates a ratio of low-luminance to medium-luminance areas in the image by totaling a number of frequencies that are less than or equal to a threshold. A threshold TH may, for example, be a tone value in the middle of the tone range of the input signal.

Figure 8C:
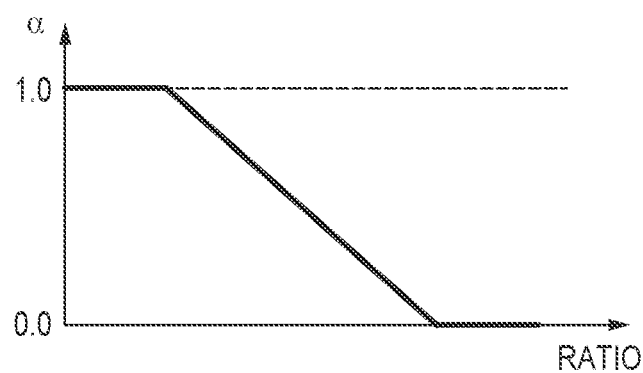

Next, using the calculated ratio, the local tone mapping processing circuit 203 obtains a coefficient α from a table set in advance, as illustrated in FIG. 8C. The coefficient α is a weight of the gain map 801, and is 0≤α≤1. In the example illustrated in FIG. 8C, the coefficient α is set such that the correction amount for the brightness of the low-luminance to medium-luminance areas is reduced when the ratio of the low-luminance to medium-luminance areas occupying the image is high. This is to suppress the effect of the local tone mapping on the brightness of the overall image when the area where the brightness is to be corrected occupies a large ratio of the image. Note that the table for obtaining the coefficient α may be changed in accordance with the purpose or intent of the dark scene shooting processing. For example, rather than suppressing the effect of local tone mapping on the brightness of the overall image, a table of the coefficient α used when prioritizing the effect of improving the tone of the dark areas may be prepared. In this case, the coefficient α can be set such that the correction amount for the brightness of the low-luminance to medium-luminance areas increases as the ratio of the low-luminance to medium-luminance areas with respect to the screen increases.

The local tone mapping processing circuit 203 then calculates a gain map to be applied to the composite image data by performing weighted adding of the gain maps 801 and 802 using the coefficient α. When the tone value of the input pixel is represented by x, the post-transform tone value is represented by y, the gain map 801 is represented by y=tm_a(x), and the gain map 802 is represented by y=tm_b(x), a gain map tm(x) used for the local tone mapping is obtained by the following Formula (4).

$$y=tm(x)=\alpha \times tm\_a(x)+(1-\alpha)\times tm\_b(x) \quad \text{Formula (4)}$$

The local tone mapping processing circuit 203 applies the gain map tm(x) obtained through Formula (4) to the pixel values of the composite image data. When the tone value of the input pixel is represented by p, an output tone value p_out after the local tone mapping processing has been applied is expressed by Formula (5).

$$p\_out=tm(p) \quad \text{Formula (5)}$$

Such local tone mapping processing suppresses blocked-up shadows in low-luminance to medium-luminance areas, and thus improves the tone characteristics. This makes it possible to further expand the dynamic range in the low-luminance direction.

According to the present embodiment, when shooting a dark scene, a plurality of shots are taken under an underexposure condition, and the resulting plurality of frames' worth of images are composited. Accordingly, shooting can be performed at a shutter speed that is faster than when shooting under an appropriate-exposure condition, an overexposure condition, or the like, making it possible to suppress blurring caused by hand shake, subject blurring, and the like. The time required for the plurality of shots can also be shortened. Furthermore, blown-out highlights in high-luminance parts can be suppressed.

In addition, before the compositing, the brightness of the overall image is corrected to the same brightness as the image obtained by shooting under an appropriate-exposure condition through the gamma processing performed on the image shot under an underexposure condition. This makes it possible to obtain a composite image having an appropriate brightness while suppressing blown-out highlights in high-luminance parts. Furthermore, random noise can be reduced during the compositing.

In addition, applying local tone mapping processing to the low-luminance and medium-luminance areas of the composite image makes it possible to suppress blocked-up shadows and further expand the dynamic range of the composite image in the low-luminance direction.

Second Embodiment

A second embodiment of the present invention will be described next. FIG. 9 is a flowchart pertaining to dark scene shooting processing performed by the image capture apparatus 100 according to the present embodiment. In FIG. 9, steps in which the same processing as in the first embodiment is performed have been given the same reference signs as those in FIG. 4. The present embodiment differs from the first embodiment in terms of the timing at which the local tone mapping processing is performed.

Specifically, the development processing circuit 201 outputs image data to the local tone mapping processing circuit 203. The local tone mapping processing circuit 203 then applies local mapping processing to the image data of each frame prior to the alignment processing being performed. The local tone mapping processing may be similar to that of the first embodiment, except that a pre-composition image is used instead of the composite image.

The local tone mapping processing circuit 203 outputs the processed image data to the composition processing circuit 202. The composition processing circuit 202 aligns and composites the images subjected to the local tone mapping processing, and outputs the resulting image from the image processing circuit 104. FIG. 2 illustrates the flow of the image data in the image processing circuit 104 according to the present embodiment as a dotted line.

The same effects as those of the first embodiment can be achieved by the present embodiment as well. In addition, image data having an effect realized by the processing up to the local tone mapping processing can be obtained even when there is significant movement between the images and the alignment and compositing cannot be performed.

Other Embodiments

Note that the dark scene shooting processing described in the foregoing embodiments may also be performed when shooting a scene other than a dark scene. For example, regardless of the shooting scene, the processing can be performed to generate an image having an expanded dynamic range.

Additionally, of the dark scene shooting processing described in the foregoing embodiments, processing aside from that involved in shooting may be performed by an electronic device (an image processing apparatus) that does not have an image capture function. In other words, the image processing apparatus can obtain image data for a plurality of frames shot under an underexposure condition from an external apparatus and apply the processing of steps S402 and on. Even with such an image processing apparatus, it is possible to obtain a composite image having an appropriate brightness while suppressing blown-out highlights in high-luminance parts. Furthermore, random noise can be reduced during the compositing.

Furthermore, in the first embodiment, if the skew amount cannot be detected in step S703, the skew amount is at least a threshold, or the like, it may be determined that the alignment processing cannot be performed normally, and the local tone mapping processing may be applied to the image data of the respective frames. As a result, the same effects as in the second embodiment can be achieved.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-63989, filed on Apr. 7, 2022, which is hereby incorporated by reference herein in its entirety.

What is claimed is:

1. An image capture apparatus comprising:
an image sensor; and
one or more processors that execute a program stored in a memory and thereby function as a plurality of units comprising:
(1) an image obtaining unit configured to obtain image data for a plurality of frames using the image sensor by performing a plurality of shots under an underexposure condition;
(2) a correction unit configured to correct a brightness of the image data for the plurality of frames; and
(3) a generation unit configured to generate data of a composite image by compositing the image data for the plurality of frames corrected by the correction unit,
wherein the correction unit corrects the brightness of image data obtained by shooting under the underexposure condition by applying a second gamma curve having tone characteristics that rises sharper in an area of low tone values than a first gamma curve that is applied to image data obtained by shooting under an appropriate-exposure condition,
wherein the first gamma curve and the second gamma curve have tone characteristics which transform a tone value corresponding to a specific subject into the same tone value, and
wherein the specific subject is an achromatic-color subject having a reflectance of 18%.

2. The image capture apparatus according to claim 1, wherein the one or more processors, when executing the program, further function as:
a processing unit configured to apply local tone mapping processing that brightens data, among the data of the composite image, having a tone value less than or equal to a threshold.

3. The image capture apparatus according to claim 1, wherein the one or more processors, when executing the program, further function as:
a processing unit configured to apply local tone mapping processing that brightens data having a tone value less than or equal to a threshold to the image data for the plurality of frames corrected by the correction unit.

4. An image capture apparatus comprising:
an image sensor; and
one or more processors that execute a program stored in a memory and thereby function as a plurality of units comprising:
(1) an image obtaining unit configured to obtain image data for a plurality of frames using the image sensor by performing a plurality of shots under an underexposure condition;
(2) a correction unit configured to correct a brightness of the image data for the plurality of frames;
(3) a generation unit configured to generate data of a composite image by compositing the image data for the plurality of frames corrected by the correction unit; and
(4) a processing unit configured to apply local tone mapping processing that brightens data having a tone value less than or equal to a threshold to the image data for the plurality of frames corrected by the correction unit,
wherein the processing unit applies the local tone mapping processing when composition of the image data for the plurality of frames corrected by the correction unit cannot be performed.

5. The image capture apparatus according to claim 4, wherein the threshold is determined based on a histogram of tone values of image data to which the local tone mapping processing is applied.

6. An image processing apparatus comprising:
one or more processors that execute a program stored in a memory and thereby function as a plurality of units comprising:
(1) an obtainment unit that obtains image data for a plurality of frames obtained by shooting under an underexposure condition;
(2) a correction unit configured to correct a brightness of the image data for the plurality of frames; and
(3) a generation unit configured to generate data of a composite image by compositing the image data for the plurality of frames corrected by the correction unit,
wherein the correction unit corrects the brightness of image data obtained by shooting under the underexposure condition by applying a second gamma curve having tone characteristics that rises sharper in an area of low tone values than a first gamma curve that is applied to image data obtained by shooting under an appropriate-exposure condition, wherein the first gamma curve and the second gamma curve have tone characteristics which transform a tone value corresponding to a specific subject into the same tone value, and wherein the specific subject is an achromatic-color subject having a reflectance of 18%.

7. A method executed by an image capture apparatus including an image sensor, the method comprising:

obtaining image data for a plurality of frames using the image sensor by performing a plurality of shots under an underexposure condition;

correcting a brightness of the image data for the plurality of frames by applying a second gamma curve having tone characteristics that rise more sharply in an area of low tone values than a first gamma curve that is applied to image data obtained by shooting under an appropriate-exposure condition, wherein the second gamma curve and the first gamma curve have tone characteristics which transform a tone value corresponding to a specific subject into the same tone value, and wherein the specific subject is an achromatic-color subject having a reflectance of 18%; and generating data of a composite image by compositing the image data for the plurality of frames corrected.

8. A non-transitory machine-readable medium that stores a program for causing, when executed by a computer of an image capture apparatus including an image sensor, the computer to function as an apparatus comprising:

an image obtaining unit configured to obtain image data for a plurality of frames using the image sensor by performing a plurality of shots under an underexposure condition;

a correction unit configured to correct a brightness of the image data for the plurality of frames; and a generation unit configured to generate data of a composite image by compositing the image data for the plurality of frames corrected by the correction unit, wherein the correction unit corrects the brightness of image data obtained by shooting under the underexposure condition by applying a second gamma curve having tone characteristics that rises sharper in an area of low tone values than a first gamma curve that is applied to image data obtained by shooting under an appropriate-exposure condition, wherein the first gamma curve and the second gamma curve have tone characteristics which transform a tone value corresponding to a specific subject into the same tone value, and wherein the specific subject is an achromatic-color subject having a reflectance of 18%.

9. A non-transitory machine-readable medium that stores a program for causing, when executed by a computer, the computer to function as an image processing apparatus comprising:

an obtainment unit that obtains image data for a plurality of frames obtained by shooting under an underexposure condition;

a correction unit configured to correct a brightness of the image data for the plurality of frames; and a generation unit configured to generate data of a composite image by compositing the image data for the plurality of frames corrected by the correction unit, wherein the correction unit corrects the brightness of image data obtained by shooting under the underexposure condition by applying a second gamma curve having tone characteristics that rises sharper in an area of low tone values than a first gamma curve that is applied to image data obtained by shooting under an appropriate-exposure condition, wherein the first gamma curve and the second gamma curve have tone characteristics which transform a tone value corresponding to a specific subject into the same tone value, and wherein the specific subject is an achromatic-color subject having a reflectance of 18%.

10. A method executed by an image capture apparatus including an image sensor, the method comprising:

obtaining image data for a plurality of frames using the image sensor by performing a plurality of shots under an underexposure condition;

correcting a brightness of the image data for the plurality of frames;

generating data of a composite image by compositing the image data for the plurality of frames corrected; and applying local tone mapping processing that brightens data having a tone value less than or equal to a threshold to the image data for the plurality of frames corrected in the correcting, wherein the applying applies the local tone mapping processing when composition of the image data for the plurality of frames corrected in the correcting cannot be performed.

* * * * *